United States Patent [19]

Usui

[11] Patent Number: 4,661,877

[45] Date of Patent: Apr. 28, 1987

[54] TRANSFORMER PROTECTIVE RELAY

[75] Inventor: Masaji Usui, Hyogo, Japan

[73] Assignee: Mitsubishi Denki Kabushiki Kaisha, Tokyo, Japan

[21] Appl. No.: 723,152

[22] Filed: Apr. 15, 1985

[30] Foreign Application Priority Data

Jun. 27, 1984 [JP] Japan ................................ 59-131202

[51] Int. Cl.4 .............................................. H02H 7/04
[52] U.S. Cl. ........................................ 361/36; 361/35; 361/60; 361/87
[58] Field of Search .................. 361/35, 36, 38, 60, 361/78, 86, 87, 85

[56] References Cited

U.S. PATENT DOCUMENTS 4,204,237  5/1980  Zocholl .................................. 361/36
4,477,854 10/1984  Usui et al. ............................. 361/36

OTHER PUBLICATIONS

"Technology in Protective Relay", Protective Relay Engineering, Jul. 20, 1981.
A Three-Phase Differential Relay for Transformer Protection, Einvall et al., IEEE Transactions on Power Apparatus and Systems, Nov./Dec. 1975, pp. 1971–1980.

Primary Examiner—M. H. Paschall
Assistant Examiner—Jeffrey A. Gaffin
Attorney, Agent, or Firm—Bernard, Rothwell & Brown

[57] ABSTRACT

A protective relay for a transformer issues a relay tripping command when the differential current that is the difference between currents in the primary and secondary windings of the transformer has a magnitude larger than the specified value and, at the same time, when the differential current includes the fifth harmonic component less than the specified value. Another cause of tripping signal generation is the differential current value processed to have a certain timer characteristics.

6 Claims, 8 Drawing Figures

TRANSFORMER PROTECTIVE RELAY

BACKGROUND OF THE INVENTION

1. Field of the Invention

The present invention relates to a protective relay for a power transformer used in a power transmission system.

2. Description of the Prior Art

An example of conventional apparatus of this type is disclosed in a publication entitled "Protective Relay Engineering", Chapter 10, 10.1, FIG. 10.4, published by the Japanese Society of Electric Engineering. FIG. 1 shows the arrangement of such apparatus which includes a terminal 1 for receiving a differential input signal, a terminal 2 for receiving a restraint signal, a ratio-differential current detection device 3, a second harmonic component detector 4, and a logical AND gate 5 for taking the logical product of the outputs of the ratio-differential current detection device 3 and the second harmonic component detector 4, all in combination constituting a ratio-differential current detector 6.

FIG. 2 shows the waveform of the excitation rush current created when a transformer is connected to the power line, FIG. 3 shows the waveform of the excitation current created when an excessive voltage is applied to a three-phase transformer, FIG. 4 is a graph showing the excessive application voltage ratio $V/V_N$ of a transformer plotted against the allowable application time length, and FIG. 5 is a graph of the transformer characteristics showing the excessive application excessive voltage ratio $V/V_N$ plotted against the excitation current. The waveform drawn by the dashed line in FIGS. 2 and 3 indicates the fundamental component.

In operation, when a voltage is applied to the transformer, an excitation rush current with the waveform shown in FIG. 2 flows, causing the detector 4 to detect that the differential current includes an excessive amount of the second harmonic component with respect to the fundamental component and, in consequence, disable the AND gate 5 thereby to hold the operation of the relay. If an excessive voltage over the rated voltage is applied to the transformer, an excitation current with the waveform as shown in FIG. 3 flows in the transformer. The excitation current over a certain threshold magnitude operates on the ratio-differential current detection device 3 to enable the AND gate 5, so that the protective relay is activated. Namely, the transformer having the excessive application voltage ratio $V/V_N$ vs. application time length characteristics as shown in FIG. 4 withstands a transitional excessive voltage, but the relay operates instantaneously in response to such excitation current characteristics due to an excessive application voltage as shown in FIG. 5.

The conventional protective relay arranged as mentioned above is apt to respond erroneously to a voltage in excess of the rated voltage applied to the transformer, even though no internal fault current flows in the transformer.

In general, the excitation current of a transformer includes a great amount of the fifth harmonic component, taking on the waveform as shown in FIG. 3. A single-phase transformer is known to create a large amount of the third harmonic component and other odd harmonic components. Whereas, in a three-phase transformer with a phase difference of 120° between each excitation current on the common time axis, the third, sixth and ninth harmonic components of the zero-phase component cancel with each other, resulting in a large proportion of the fifth harmonic component.

SUMMARY OF THE INVENTION

It is an object of the present invention to provide an improved transformer protective relay operable surely to issue a trip command only in response to the need for disconnecting the transformer from the power line for the purpose of protecting the transformer.

According to one aspect of this invention, the transformer protective relay comprises a ratio-differential current detector which produces an output when a differential current indicating the difference between the currents of the primary and secondary windings of the transformer exceeds a predetermined value, a fifth harmonic component detection means which produces an output when the differential current includes the fifth harmonic component in excess of a predetermined value, a first gate means which enables the output of the ratio-differential current detector to pass in response to the absence of the output of the fifth harmonic component detection means, a timer circuit which receives the differential current as an input signal and provides it with a predetermined timer characteristic, and a second gate means which produces a trip command for tripping the relay in response to the reception of at least one of the outputs of the first gate means and the timer circuit.

The ratio-differential current detector provides an output when the differential current has magnitude greater than the predetermined value and, at the same time, when the differential current includes the fifth harmonic component less than the predetermined value. In order for the output of the ratio-differential current detector to be a trip command, another condition, i.e., the differential current includes the fifth harmonic component less than the predetermined value, must be satisfied. In parallel to the above operation, the differential current causes the generation of the trip command when it fulfills the predetermined timer characteristics irrespective of the output the ratio-differential current detector.

DETAILED DESCRIPTION OF THE PREFERRED EMBODIMENTS

Figure 6:
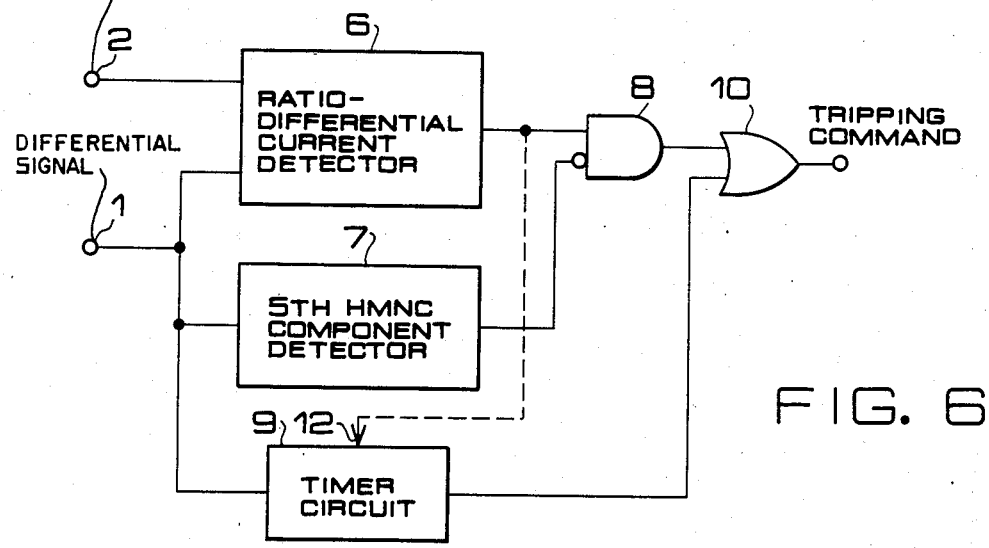
FIG. 6 is a block diagram showing the transformer protective relay embodying the present invention.

An embodiment of this invention will now be described with reference to the drawings. In FIG. 6, the same or equivalent components to those shown in FIG.

1 are referred to by the common symbols. The inventive circuit arrangement includes a detector 7 for detecting the amount of the fifth harmonic component included in the differential current, a logical AND gate 8 which produces an active output when the ratio-differential current detector 6 provides an active output and the fifth harmonic component detector 7 provides no active output, a timer circuit 9 which operates to provide the differential input with predetermined timer characteristics, and a logical OR gate 10 connected to receive the outputs of the timer circuit 8 and the AND gate 8.

Figure 1:
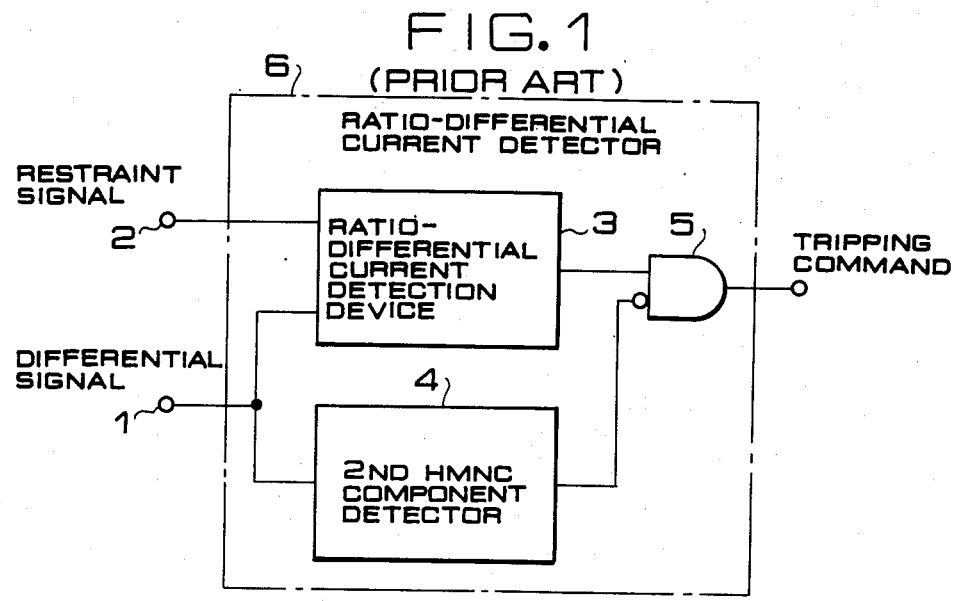
FIG. 1 is a block diagram showing the conventional transformer protective relay.
Figure 2:
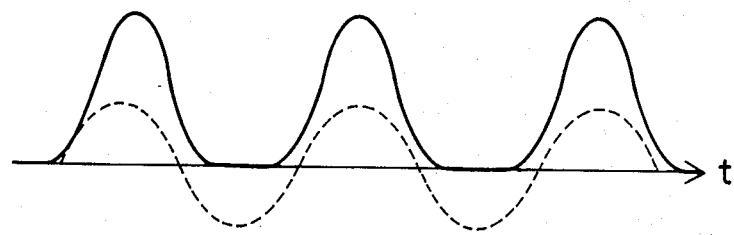
FIG. 2 is a diagram showing a typical waveform of the excitation rush current in the transformer.
Figure 3:
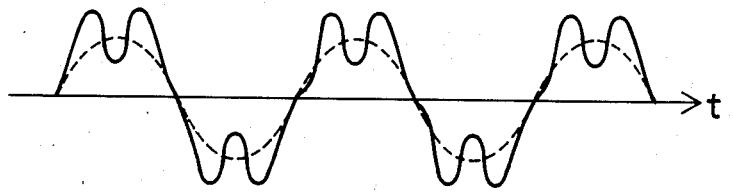
FIG. 3 is a diagram showing the waveform of the excitation current when an excessive voltage is applied to the transformer.
Figure 4:
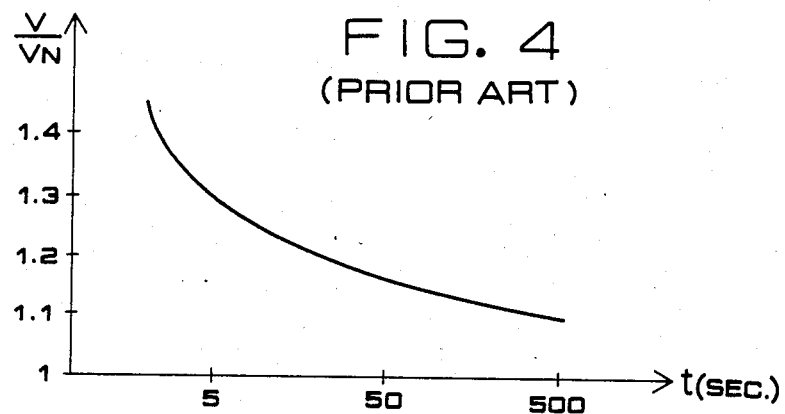
FIG. 4 is a graph showing the excessive application voltage ratio $V/V_N$ vs. allowable application time length characteristics of the transformer.
Figure 5:
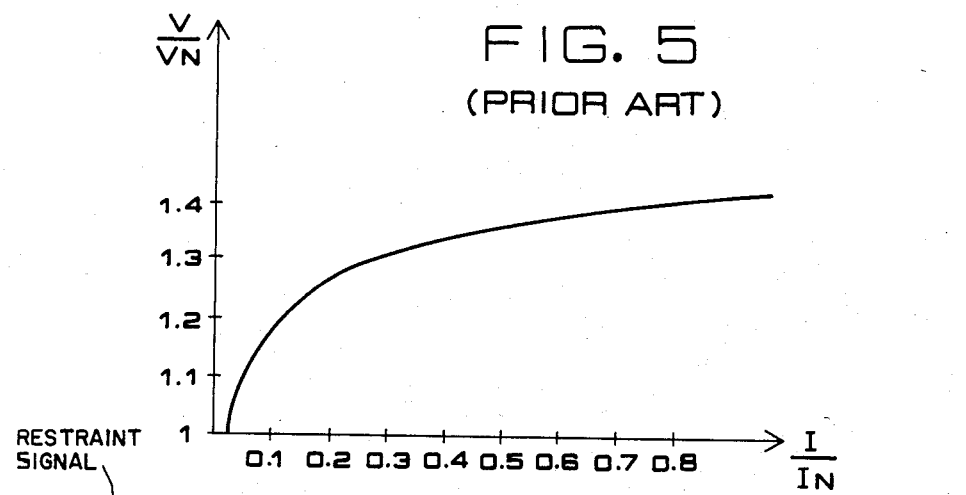
FIG. 5 is a graph showing the excessive excessive voltage ratio $V/V_N$ vs. excitation current characteristics of the transformer.

The operation of the above arrangement is as follows. When the detector 7 detects that the transformer current includes the fifth harmonic component greater than a certain value, it provides an output to disable the AND gate 8 from conducting the output of the ratio-differential current detector 6, and the relay is not operated. The timer circuit 9 operates to provide a certain timer characteristics for the differential input. The timer characteristics are the ultra-inverse time limit characteristics or stepped timer characteristics based on the presumption derived from the excitation current vs. operating time characteristics calculated from the application voltage ratio $V/V_N$ vs. allowable time characteristics of the transformer shown in FIG. 4 and the excessive voltage ratio $V/V_N$ vs. excitation current characteristics of the transformer shown in FIG. 5. The presumption process is conducted by a known technique, for example, using a function transformation circuit as disclosed in Japanese Patent Application Laid-open No. 58-3522.

Figure 7:
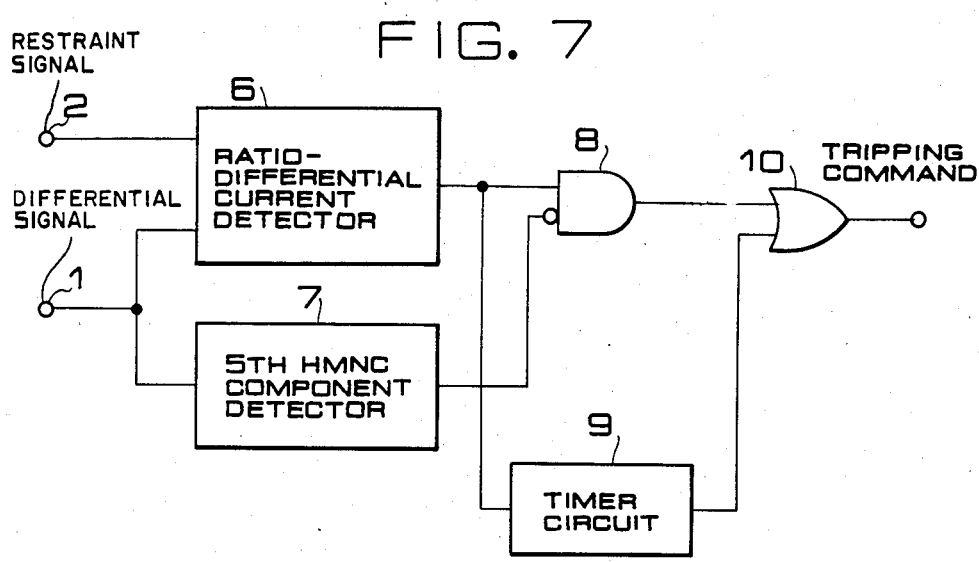
FIGS. 7 and 8 are block diagrams showing other embodiments of the present invention.

Alternatively, as shown in FIG. 7, the arrangement may be made without considering the excitation current vs. operating time characteristics in such a way that the timer circuit 9 receives the output signal of the ratio-differential current detector 6. In this case, a satisfactory protective operation for the transformer is realized, although the protective operation is less accordance in time to the allowable excessive-voltage application time of the transformer to be protected.

Figure 8:
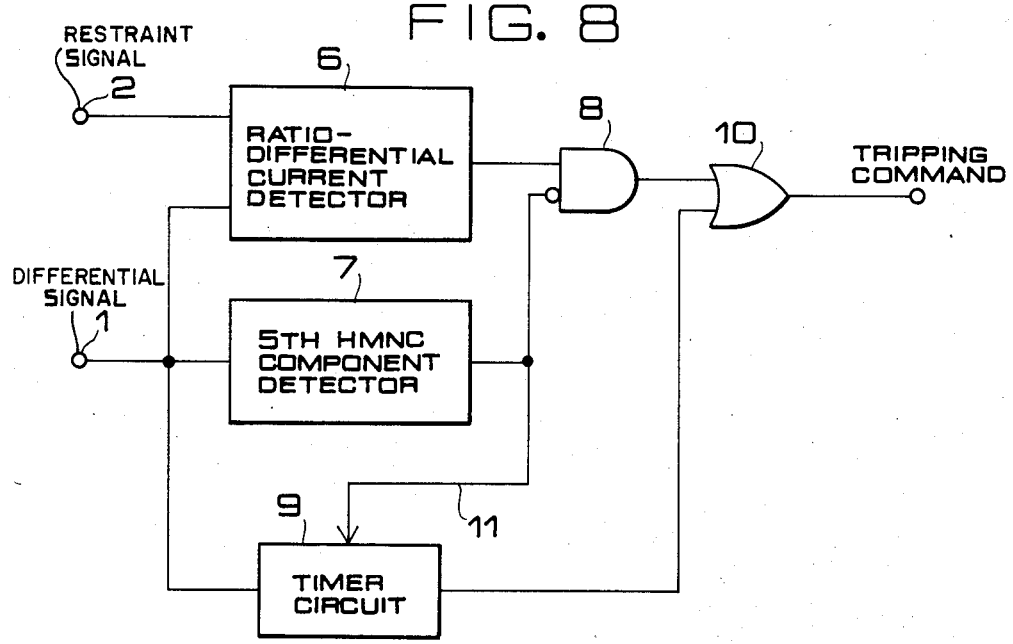

In case enhanced reliability is required, the inventive transformer protective relay may be arranged as shown in FIG. 8. In this embodiment, the timer circuit 9 receiving the differential signal is further provided with an input terminal, to which is applied the output signal from the detector 7 as a trigger signal 11 for determining the timing of activation. The additional input terminal may alternatively be adapted to receive the output signal from the ratio-differential current detector 6 as a trigger signal 12 as shown by the dashed line in FIG. 6. In both cases, the timer circuit 9 commences the timer operation in response to the fulfillment of the logical AND condition for the two input signals.

According to the present invention, as described above, the arrangement is made such that the output of the ratio-differential current detector is inhibited by the fifth harmonic component detector and certain timer characteristics determined in dependence on the magnitude of the differential current are provided, whereby a transformer protective relay operable in accordance with the allowable time length of an excessive voltage application to the transformer can be realized economically.

What is claimed is:

1. A protective relay for a transformer comprising:
   a ratio-differential current detection means which produces an output when the magnitude of a differential current that is the difference between currents in a primary and secondary windings of the transformer is in excess of a predetermined value;
   a fifth harmonic component detection means which produces an output when said differential current includes a fifth harmonic component greater than a predetermined value;
   a first gate means which receives the output of said ratio-differential current detection means and which provides an output when the output of said fifth harmonic component detection means is absent;
   a timer circuit which receives an input signal representing said differential current and provides an output on the basis of a predetermined time characteristic; and
   a second gate means which produces a trip command for tripping said relay in response to the reception of at least one of the outputs of said first gate means and said timer circuit.

2. A protective relay according to claim 1, wherein said timer circuit has ultra-inverse time limit ccharacteristics corresponding to an excessive voltage vs. allowable application time length characteristics of the transformer to be protected.

3. A protective relay according to claim 1, wherein said timer circuit has predetermined stepped timer characteristic.

4. A protective relay according to claim 1, wherein said timer circuit is activated by the operation of said ratio-differential current detection means and adapted to produce an output on expiration of a predetermined time.

5. A protective relay according to claim 1, wherein said timer circuit receives the value of said differential current as a first input and the output of said ratio-differential current detection means as a second input, and commences the timer operation in response to the fulfillment of the logical AND condition for said first and second inputs.

6. A protective relay according to claim 1, wherein said timer circuit receives the value of said differential current as a first input and the output of said fifth harmonic component detection means as a second input, and commences the timer operation in response to the fulfillment of the logical AND condition for said first and second inputs.

* * * * *